(12) United States Patent
Tsai

(10) Patent No.: US 6,298,952 B1
(45) Date of Patent: Oct. 9, 2001

(54) BRAKE OF REAR WHEEL OF SCOOTER

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/672,298

(22) Filed: Sep. 29, 2000

(51) Int. Cl.$^7$ .............................. B62K 9/00; B62M 1/00
(52) U.S. Cl. ..................... 188/29; 188/74; 280/87.041; 280/11.204
(58) Field of Search ............................ 188/19, 74, 29, 188/1.12; 280/87.041, 87.05, 14.28, 11.201, 11.204, 11.207, 11.208, 11.209, 11.211, 11.212, 11.214, 11.215, 11.216, 11.217, 11.25, 221; D21/423; 180/219

(56) References Cited

U.S. PATENT DOCUMENTS

| | | |
|---|---|---|
| 606,525 | 6/1898 | Dunning et al. . |
| 628,433 | 7/1899 | Finch . |
| 730,622 | 6/1903 | Edmunds . |
| 1,345,038 | 6/1920 | Uppling . |
| 1,534,601 | 4/1925 | Matveyeff . |
| 1,614,822 | 1/1927 | Bukolt . |
| 1,653,558 | 12/1927 | Fisher . |
| 1,687,739 | 10/1928 | Slusher . |

(List continued on next page.)

FOREIGN PATENT DOCUMENTS

| | | |
|---|---|---|
| 197 11 042 A1 | 9/1998 | (DE) . |
| 0396141 | 4/1909 | (FR) . |
| 0699673 | 11/1953 | (GB) . |

OTHER PUBLICATIONS

Dirt King, "Declaration of James R. Funk", –Alleged public use and service in 1985; drawings and xerographic copies of photographs, Dec. 14–2000.

Xerographic copy of photographs or advertisements relating to "K2"scooter, date unknown.

Xerographic copy photos or advertisements relating to "Rollerboard" scooter, date unknown.

Tranz X drawings, 1998.

Shaper Image Catalogue, Aug. 1998.

*Primary Examiner*—Douglas C. Butler
(74) *Attorney, Agent, or Firm*—Browdy and Neimark

(57) ABSTRACT

A scooter rear wheel brake comprises a first wheel cover and a second wheel cover. The first wheel cover is mounted on the support frame of the scooter and is located over a predetermined position of the wheel rim. The first wheel cover is provided with a connection portion. The second wheel cover is movably connected with the connection portion of the first wheel cover such that the second wheel cover is located over another predetermined position of the wheel. The first wheel cover can be freely disposed at the position of the second wheel cover. The second wheel cover can be pressed against the wheel rim to bring about the braking effect.

9 Claims, 5 Drawing Sheets

U.S. PATENT DOCUMENTS

| | | |
|---|---|---|
| 1,701,410 | 2/1929 | Hornquist . |
| 1,714,000 | 5/1929 | Davis . |
| 2,198,667 | 4/1940 | Hagenes . |
| 2,439,556 | 4/1948 | Bancroft . |
| 2,460,395 | 2/1949 | Reid . |
| 3,006,659 | 10/1961 | Kransnoff . |
| 3,288,251 | 11/1966 | Sakwa . |
| 3,484,116 | 12/1969 | Allen . |
| 3,684,305 | 8/1972 | McDonald et al. . |
| 3,876,217 | 4/1975 | Copier . |
| 3,891,225 | 6/1975 | Sessa . |
| 4,003,582 | 1/1977 | Maurer . |
| 4,033,596 | 7/1977 | Andorsen et al. . |
| 4,088,334 | 5/1978 | Johnson . |
| 4,102,541 | 7/1978 | Altorfer et al. . |
| 4,103,917 | 8/1978 | Widolf . |
| 4,166,629 | 9/1979 | List . |
| 4,169,687 | 10/1979 | Schull . |
| 4,179,134 | 12/1979 | Atkinson . |
| 4,202,559 | 5/1980 | Piazza, Jr. . |
| 4,394,029 | 7/1983 | Holmgren . |
| 4,790,550 | 12/1988 | Simpson . |
| 4,795,181 | 1/1989 | Armstrong . |
| 4,799,701 | 1/1989 | Lindau et al. . |
| 5,042,622 | 8/1991 | Smith et al. . |
| 5,192,099 | 3/1993 | Riutta . |
| 5,320,367 | 6/1994 | Landis . |
| 5,383,536 | 1/1995 | Butter et al. . |
| 5,927,733 | 7/1999 | Banda . |
| 6,139,035 | 10/2000 | Tsai . |
| 6,179,307 * | 1/2001 | Mao ............................ 280/87.041 |

* cited by examiner

BRAKE OF REAR WHEEL OF SCOOTER

FIELD OF THE INVENTION

The present invention relates generally to a scooter, and more particularly to a brake of rear wheel of the scooter.

BACKGROUND OF THE INVENTION

As shown in FIG. 1, the wheel of the conventional scooter is provided with a wheel cover which is directly mounted on a support frame such that the wheel cover is pressed against the wheel in motion, thereby acting as a brake. The wheel cover is not effective in serving as the brake. In addition, the wheel cover is subject to fatigue.

As shown in FIG. 2, the wheel cover is pivoted to the support frame such that the wheel cover is urged by an elastic member to remain apart from the wheel. In light of the rear wheel cover being relatively large and being supported at one end, the wheel cover is prone to move aside when it is pressed against the wheel. In addition, when the wheel cover is pressed against the wheel, there is only a small contact area between the wheel cover and the wheel, which is not effective in braking the wheel in motion.

SUMMARY OF THE INVENTION

It is the primary objective of the present invention to provide a scooter with an effective brake.

It is another objective of the present invention to provide a scooter with a brake capable of braking the rear wheel of the scooter with precision.

The rear wheel braking device of the present invention comprises a first wheel cover mounted on the support frame of the scooter such that the first wheel cover is located over a predetermined position of the wheel and is provided with a connection portion located at the predetermined position of the wheel cover. A second wheel cover is movably connected with the connection portion of the first wheel cover such that the wheel cover covers a predetermined position of the wheel. Both first wheel cover and the second wheel cover work as a brake.

DETAILED DESCRIPTION OF THE INVENTION

Figure 1:
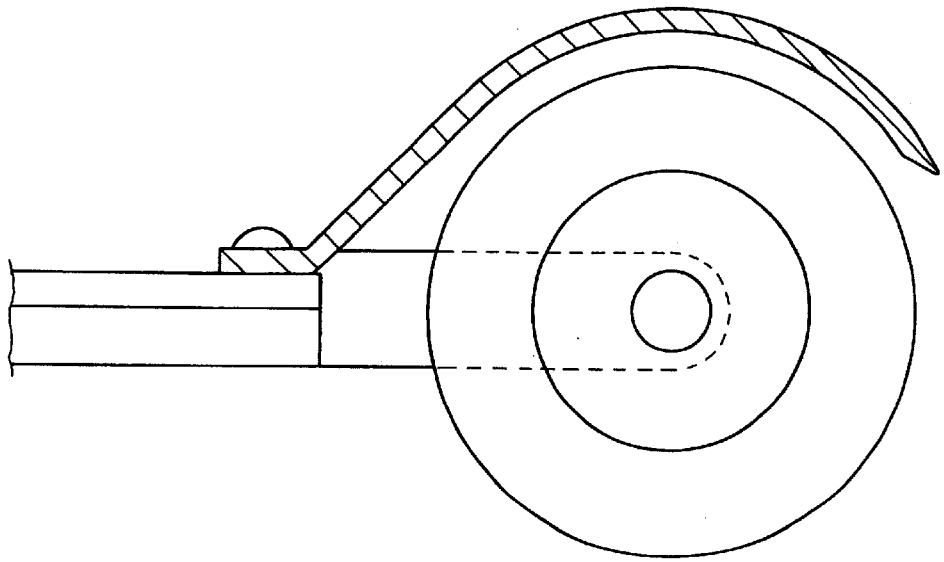
FIG. 1 shows a side view of a conventional scooter brake device.
Figure 2:
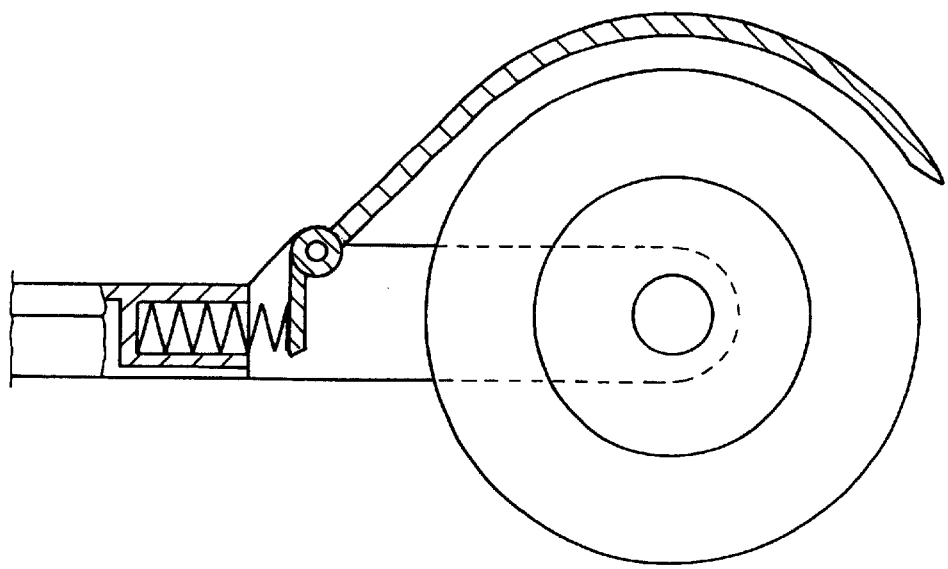
FIG. 2 shows a side view of another prior art scooter brake device.
Figure 3:
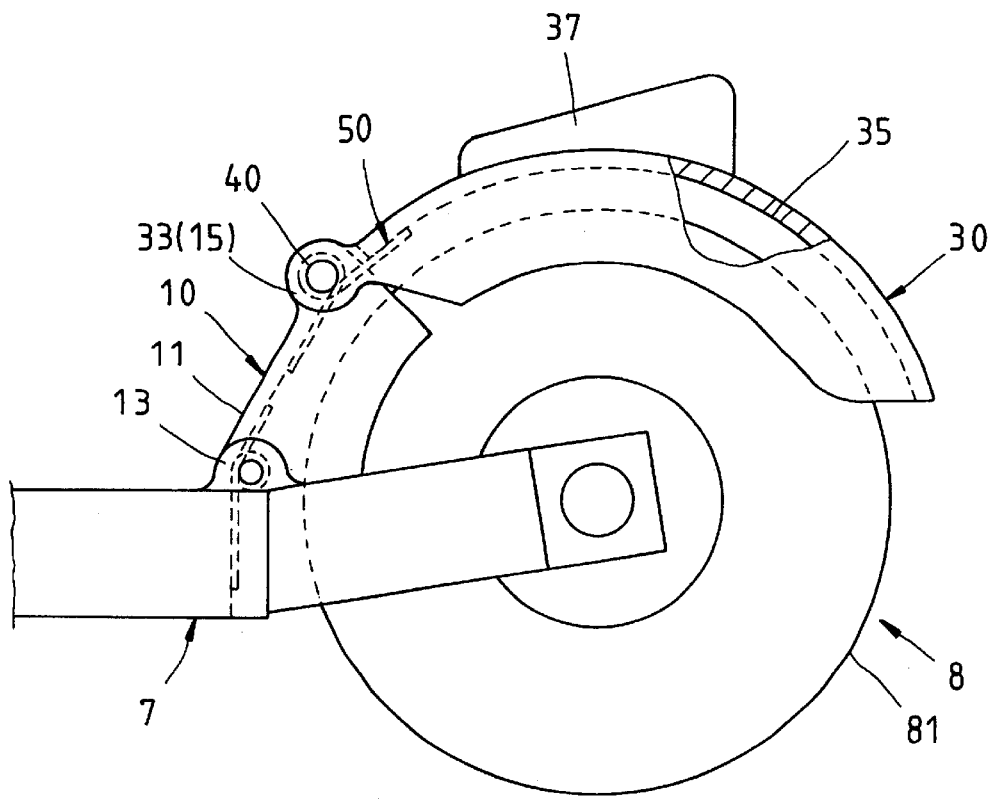
FIG. 3 shows a side plan view of a first preferred embodiment of the present invention.

As shown in FIG. 3, a scooter rear wheel brake is mounted on a support frame 7 of the scooter such that the brake covers the wheel 8 having a rim 81 in contact with the ground surface.

Figure 5:
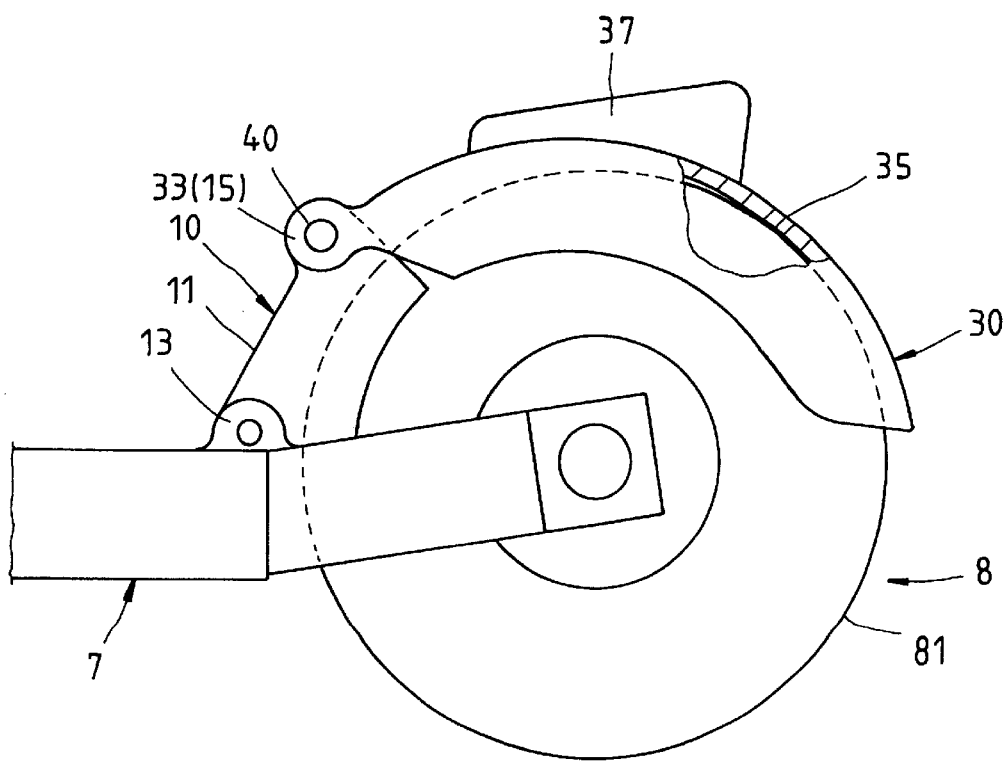
FIG. 5 shows a schematic view of the braking action of FIG. 3.
Figure 4:
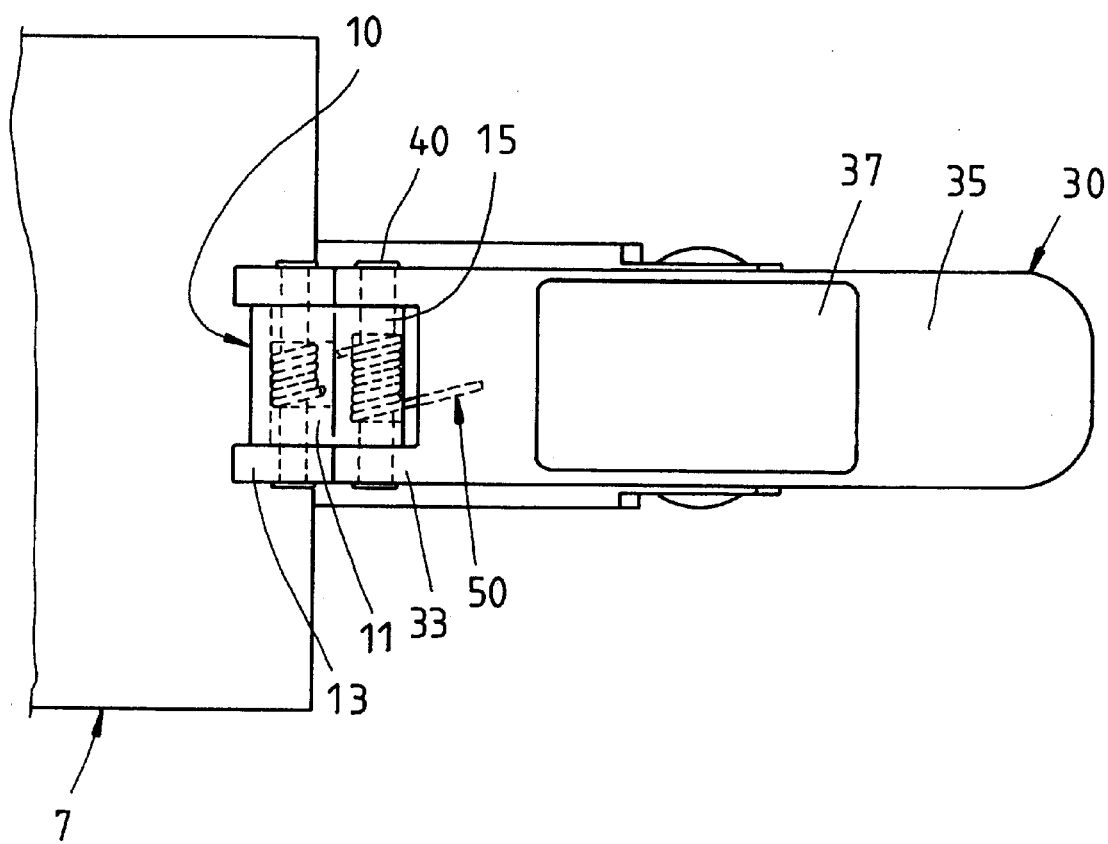
FIG. 4 shows a top view of the first preferred embodiment of the present invention.

As shown in FIGS. 3–5, the brake device of the present invention comprises a first wheel cover 10 and a second wheel cover 30.

The first wheel cover 10 has a cover body 11 mounted on the support frame 7 such that the cover body 11 covers a predetermined portion of the rim 81. The first wheel cover has a connection portion 13 disposed at a predetermined position of the cover body 11, and a pivoting portion 15 disposed at the rearward side of the cover body.

The second wheel cover 30 is connected with the connection portion 13 and is composed of a cover body 31, a pivoting portion 33 for pivoting a pivoting member 40, and a torsion spring 50 for forcing the cover body to swivel away from the wheel 8. The second wheel cover 30 is provided in the inner side with a friction surface 35 to press against the wheel 8 to stop the wheel 8, and a brake applying portion 37 mounted on the top thereof.

The first wheel cover 10 is freely disposed at the position of the second wheel cover 30. The second wheel cover 30 is pressed against the rim of the wheel 8 to bring about the braking effect.

As shown in FIG. 5, the brake device is activated by a foot pressing against the brake applying portion 37 of the second wheel cover 30 such that the second wheel cover 30 overcomes the spring force of the torsion spring 50, thereby forcing the friction surface 35 to press against the wheel 8.

Figure 6:
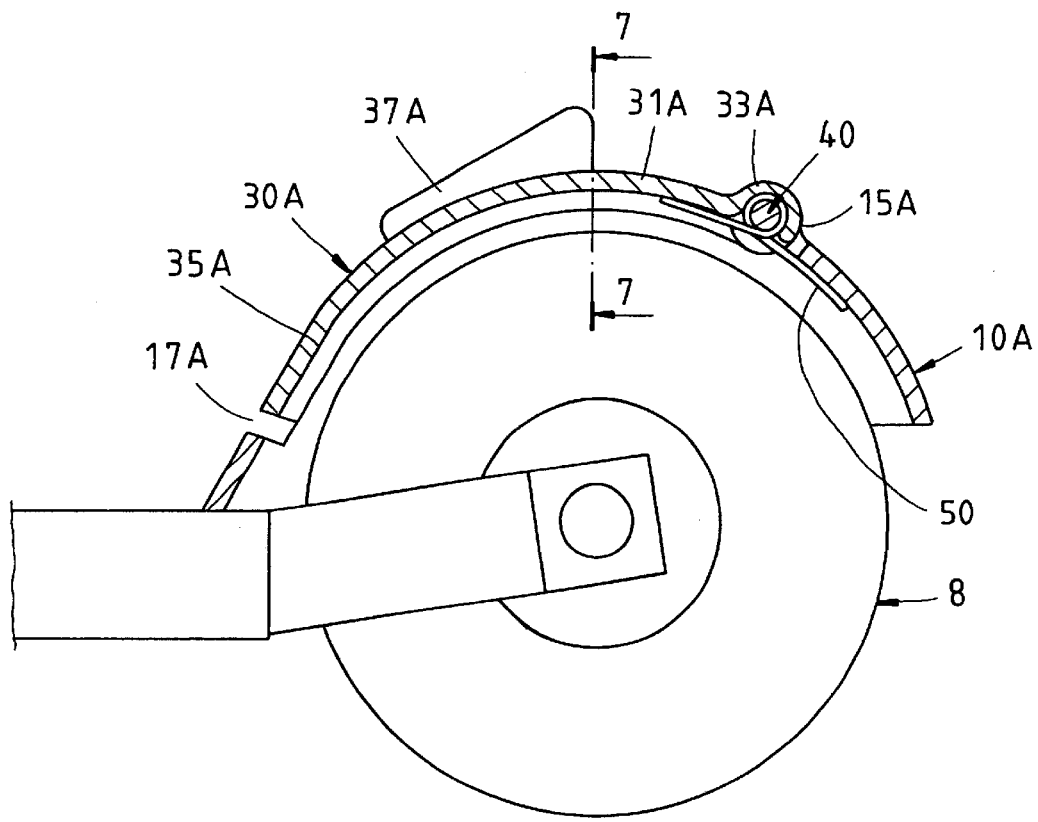
FIG. 6 shows a side view of a second preferred embodiment of the present invention.
Figure 7:
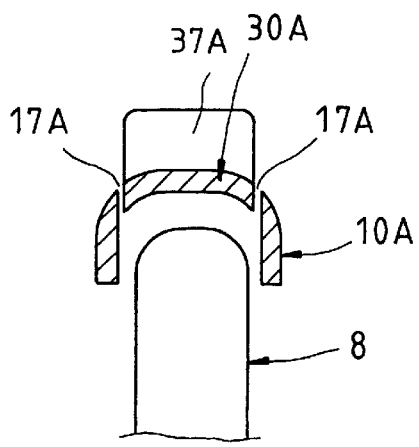
FIG. 7 shows a sectional view taken along the direction indicated by a line 7—7 as shown in FIG. 6.

As shown in FIG. 6, another preferred embodiment of the present invention comprises a first wheel cover 10A which extends to the rear section of the wheel 8, with the middle section reaching the connection portion of the frame. The cover 10A is provided with an opening 17A and a pivoting portion 15A.

The second wheel cover 30A is also provided with a pivoting portion 33A for pivoting a pivoting member 40 at the pivoting portion 15A of the first wheel cover 10A. The cover body 31A is received in the opening 17A of the first wheel cover 10A. The cover 30A is provided with a brake applying portion 37A.

The torsion spring 50 is mounted on the pivoting member 40 such that both ends of the spring 50 are disposed at the first and the second wheel covers 10A and 30A, so as to enable the s econd wheel cover 30A to swing away from the wheel.

Figure 8:
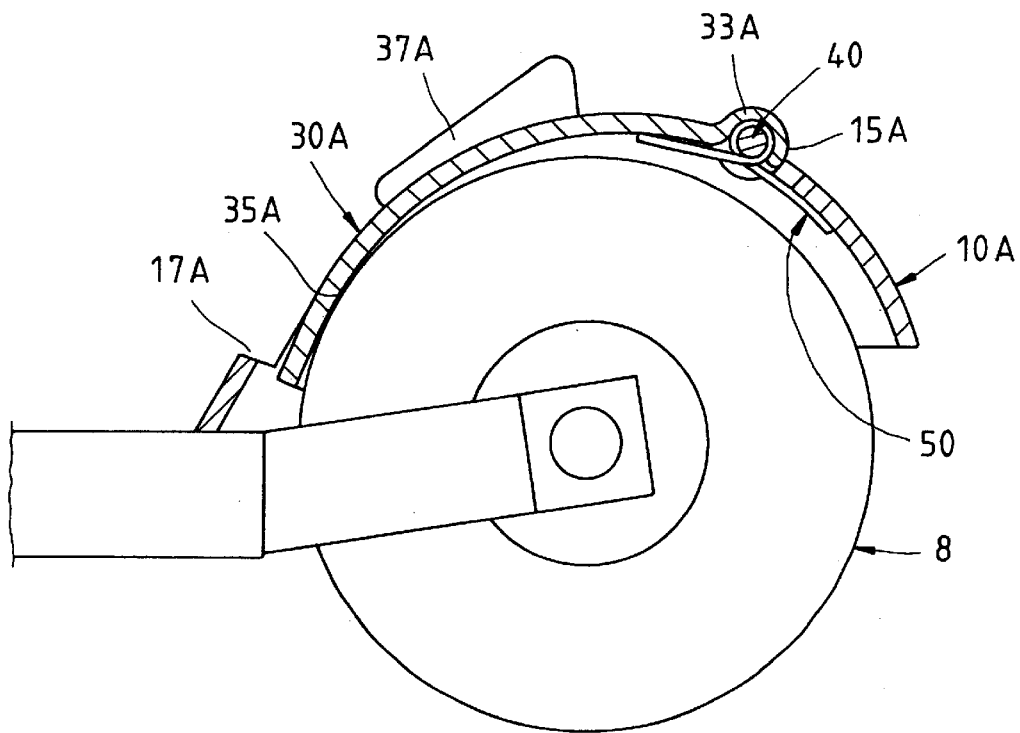
FIG. 8 shows a schematic view of the braking action of FIG. 6.

The braking action of this embodiment is similar to that of the previous embodiment. As shown in FIG. 8, when the brake applying portion 37A is pressed by the foot, the second wheel cover 30A comes in contact with the rim of the wheel 8 thereby resulting in a braking action.

Figure 9:
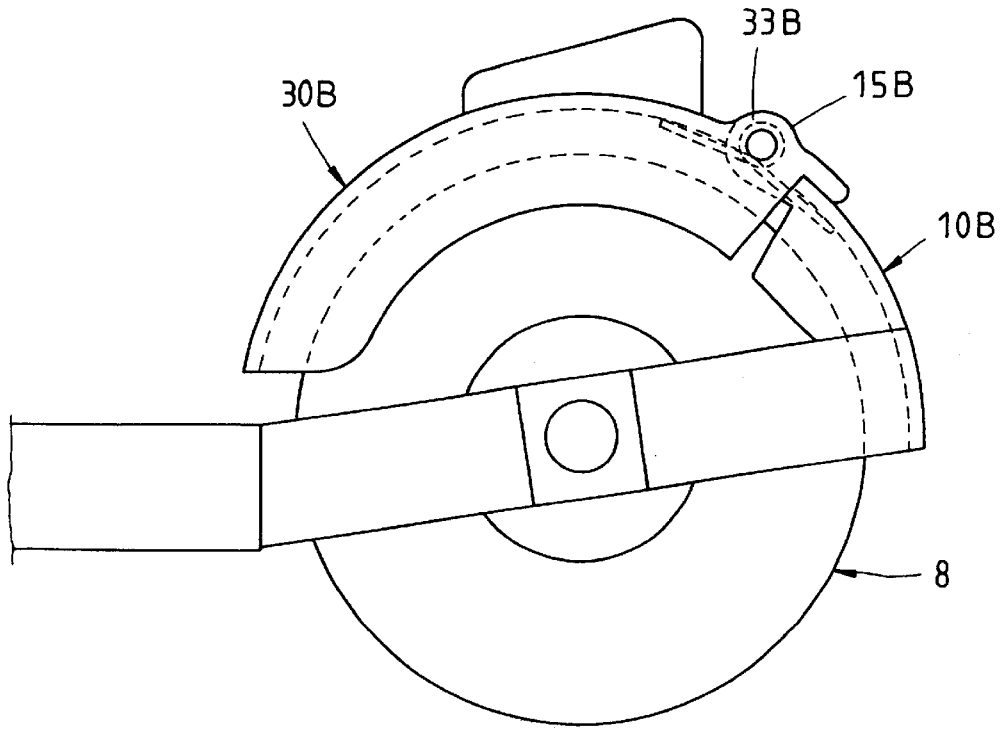
FIG. 9 shows a side view of a third preferred embodiment of the present invention.

As shown in FIG. 9, another embodiment of the present invention has a first wheel cover 10B which is connected with the wheel 8 such that the first wheel cover 10B is corresponding in location to the rear portion of the scooter, and that the first wheel cover 10B is provided with a pivoting portion 15B. The second wheel cover 30B is connected with the connection portion 33B of the first wheel cover 10B and is capable of pressing against the rim of the wheel so as to bring about the braking action.

The elastic member of the present invention may be a torsion spring or flat spring.

The embodiments of the present invention described above are to be regarded in all respects as being merely illustrative and not restrictive. Accordingly, the present invention may be embodied in other specific forms without deviating from the spirit thereof. The present invention is therefore to be limited only by the scopes of the following appended claims.

What is claimed is:

1. A scooter rear wheel brake comprising:

a first wheel cover mounted on a scooter support frame such that said first wheel cover is located over a predetermined position of the rim of the rear wheel, said first wheel cover provided with a connection portion; and a second wheel cover movably connected with said connection portion such that said second wheel cover is located over another predetermined position of the rim of the rear wheel;

said first wheel cover capable of being freely disposed in the position of said second wheel cover whereby said second wheel cover is capable of being pressed against the rim of the rear wheel.

2. The scooter rear wheel brake as defined in claim 1, wherein said first wheel cover is fastened with the scooter support frame.

3. The scooter rear wheel brake as defined in claim 1, wherein said first wheel cover is movably mounted on the support frame to press against the rim of the rear wheel.

4. The scooter rear wheel brake as defined in claim 1, wherein said second wheel cover is pivoted with said connection portion of said first wheel cover and is urged by an elastic member.

5. The scooter rear wheel brake as defined in claim 4, wherein said elastic member is a torsion spring.

6. The scooter rear wheel brake as defined in claim 4, wherein said elastic member is a flat spring.

7. The scooter rear wheel brake as defined in claim 1, wherein said first wheel cover is fastened with the scooter such that said first wheel cover is located over the rear of said wheel; wherein said second cover is located over the front of said wheel.

8. The scooter rear wheel brake as defined in claim 1, wherein said first wheel cover is provided with an opening for receiving said second wheel cover.

9. The scooter rear wheel brake as defined in claim 1, wherein said second wheel cover is provided in the external side thereof with a brake applying portion whereby said brake applying portion is pressed by a foot to activate said second wheel cover.

\* \* \* \* \*